United States Patent
Idogawa et al.

(10) Patent No.: US 11,248,570 B2
(45) Date of Patent: Feb. 15, 2022

(54) ENGINE APPARATUS

(71) Applicant: TOYOTA JIDOSHA KABUSHIKI KAISHA, Aichi-ken (JP)

(72) Inventors: Masanao Idogawa, Nagoya (JP); Takahiro Uchida, Okazaki (JP); Masahiro Kachi, Nagakute (JP); Reiko Goh, Toyota (JP); Hirokatsu Yamamoto, Chita (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/175,698

(22) Filed: Feb. 15, 2021

(65) Prior Publication Data

US 2021/0317806 A1  Oct. 14, 2021

(30) Foreign Application Priority Data

Apr. 14, 2020  (JP) .............................. JP2020-072488

(51) Int. Cl.
*F02M 25/08* (2006.01)
*F02D 41/00* (2006.01)
(Continued)

(52) U.S. Cl.
CPC ........... *F02M 37/54* (2019.01); *F02D 41/004* (2013.01); *F02D 41/0007* (2013.01);
(Continued)

(58) Field of Classification Search
CPC ............... F02M 25/08; F02M 25/0836; F02M 25/0872; F02M 25/089; F02M 35/10157; F02M 35/10229; F02D 41/0007; F02D 41/003; F02D 41/0032; F02D 41/004; F02D 41/0045; F02D 2250/41
See application file for complete search history.

(56) References Cited

U.S. PATENT DOCUMENTS 5,005,550 A * 4/1991 Bugin, Jr. ............ F02M 25/089
                                                        123/520
2013/0104857 A1* 5/2013 Schulz ................. F02M 25/089
                                                        123/520

(Continued)

FOREIGN PATENT DOCUMENTS

JP  2014240622 A  * 12/2014
JP  2017031936 A  *  2/2017
JP     201952561 A      4/2019

*Primary Examiner* — John M Zaleskas
(74) *Attorney, Agent, or Firm* — Hauptman Ham, LLP (57) ABSTRACT

An engine apparatus includes an engine, a supercharger, an evaporated fuel treatment device, a controller and the engine apparatus is configured to determine a purge classification whether the evaporated fuel is a first purge in which the evaporated fuel flows dominantly in a first purge passage or a second purge in which the evaporated fuel flows dominantly in a second purge passage based on a relative ejector pressure that is a pressure of a suction port of the ejector and a value obtained by adding an offset amount based on a cross-sectional area of the second purge passage with respect to a cross-sectional area of the first purge passage to a pressure behind a throttle valve that is the pressure on a downstream side of the throttle valve of the intake pipe.

4 Claims, 7 Drawing Sheets

(51) Int. Cl.
*F02M 37/54* (2019.01)
*F02M 37/14* (2006.01)

(52) U.S. Cl.
CPC ....... *F02D 41/0045* (2013.01); *F02M 25/089* (2013.01); *F02M 25/0836* (2013.01); *F02M 25/0872* (2013.01); *F02M 37/14* (2013.01); *F02D 2200/0406* (2013.01)

(56) References Cited

U.S. PATENT DOCUMENTS

| | | | |
|---|---|---|---|
| 2014/0116399 A1* | 5/2014 | Ulrey | F01M 13/022 123/520 |
| 2014/0257672 A1* | 9/2014 | Surnilla | F02D 41/144 701/103 |
| 2015/0114348 A1* | 4/2015 | Pursifull | F01M 13/04 123/403 |
| 2015/0114350 A1* | 4/2015 | Pursifull | F02M 35/10255 123/445 |
| 2015/0308310 A1* | 10/2015 | Pursifull | F01M 13/022 123/403 |
| 2016/0069304 A1* | 3/2016 | Guidi | F02M 26/03 123/518 |
| 2016/0201613 A1* | 7/2016 | Ulrey | F02D 41/0032 123/520 |
| 2016/0201615 A1* | 7/2016 | Pursifull | F02D 41/0032 123/520 |
| 2016/0273494 A1* | 9/2016 | Hotta | F02D 41/0032 |
| 2016/0369721 A1* | 12/2016 | Pursifull | F02D 41/004 |
| 2017/0226939 A1* | 8/2017 | Akita | B01D 53/0415 |
| 2018/0163646 A1* | 6/2018 | Tsutsumi | F02M 35/1038 |
| 2018/0223775 A1* | 8/2018 | Wodausch | F02D 41/0087 |
| 2019/0040823 A1* | 2/2019 | Pursifull | F02D 41/08 |
| 2019/0048830 A1* | 2/2019 | Akiyama | F02M 25/089 |
| 2020/0025156 A1* | 1/2020 | Mizushima | F02D 41/0045 |
| 2020/0095957 A1* | 3/2020 | Hashimoto | F02M 25/089 |
| 2020/0149486 A1* | 5/2020 | Tachibana | F02M 35/1038 |

* cited by examiner

ENGINE APPARATUS

CROSS-REFERENCE TO RELATED APPLICATION

This application claims priority to Japanese Patent Application No. 2020-072488 filed on Apr. 14, 2020, incorporated herein by reference in its entirety.

BACKGROUND

1. Technical Field

The present disclosure relates to an engine apparatus.

2. Description of Related Art

Conventionally, as this kind of engine apparatus, there is proposed an engine apparatus that includes an engine that receives fuel from a fuel tank and has a throttle valve disposed in an intake pipe; a supercharger having a compressor disposed on an upstream side of the throttle valve of the intake pipe, and an evaporated fuel treatment device that supplies purge gas (evaporated fuel gas) containing evaporated fuel generated in the fuel tank to the intake pipe (refer to Japanese Unexamined Patent Application Publication No. 2019-052561 (JP 2019-052561 A)). Here, the evaporated fuel treatment device has a supply passage for supplying the purge gas to the intake pipe, a purge control valve provided in the supply passage, and an ejector. The supply passage branches into the first purge passage and the second purge passage at the intake pipe side rather than the purge control valve, and the first purge passage is connected to a downstream side of the throttle valve of the intake pipe. The intake port of the ejector is connected between the compressor and the throttle valve provided in the intake pipe through a recirculation passage, the exhaust port is connected to an upstream side of the compressor of the intake pipe, and the suction port is connected to the second purge passage. The engine apparatus, by opening the purge control valve, supplies the purge gas to a downstream side of the throttle valve of the intake pipe through the first purge passage, and supplies the purge gas to an upstream side of the compressor of the intake pipe through the second purge passage and the ejector. Then, the engine apparatus, by comparing the pressure on a downstream side of the throttle valve of the intake pipe and the generated pressure of the ejector, detects whether the purge flows in the first purge passage or in the second purge passage and controls the purge control valve using the control characteristic data corresponding to the purge passage.

SUMMARY

In the engine apparatus, the purge passage through which the purge flows is detected by comparing the pressure on a downstream side of the throttle valve of the intake pipe with the pressure generated by the ejector, but the purge passage through which the purge flows dominantly may be erroneously detected depending on the cross-sectional areas of the first purge passage and the second purge passage. When the pipe diameter of the first purge passage and the pipe diameter of the second purge passage are different, the pressure loss with respect to the purge flow is different, such that the purge passage through which the purge flows cannot be properly detected simply by comparing the pressure on a downstream side of the throttle valve of the intake pipe with the pressure generated by the ejector.

A main object of the engine apparatus of the present disclosure is to more properly determine the purge passage in which purge flows dominantly.

The engine apparatus of the present disclosure has adopted following means in order to achieve the main object.

An aspect of the disclosure relates to an engine apparatus including an engine, a supercharger, an evaporated fuel treatment device, and a controller. The engine receives fuel from a fuel tank and has a throttle valve disposed in an intake pipe. The supercharger has a compressor disposed on an upstream side of the throttle valve of the intake pipe. The evaporated fuel treatment device has a supply passage for supplying evaporated fuel gas containing evaporated fuel generated in the fuel tank to the intake pipe and a purge control valve provided in the supply passage. The controller is configured to, in a case where the evaporated fuel gas is supplied to the intake pipe, set a drive duty of the purge control valve based on a full-open purge rate when the drive duty is 100% and a required purge rate and control the purge control valve. The supply passage branches into a first purge passage and a second purge passage at the intake pipe side from the purge control valve. The first purge passage is connected to a downstream side of the throttle valve of the intake pipe. The evaporated fuel treatment device further has an ejector that has an intake port connected between the compressor and the throttle valve provided in the intake pipe through a recirculation passage, an exhaust port connected to an upstream side of the compressor of the intake pipe, and a suction port connected to the second purge passage. The controller is configured to determine a purge classification whether the evaporated fuel is a first purge in which the evaporated fuel flows dominantly in the first purge passage or a second purge in which the evaporated fuel flows dominantly in the second purge passage based on a relative ejector pressure that is a pressure of the suction port of the ejector and a value obtained by adding an offset amount based on a cross-sectional area of the second purge passage with respect to a cross-sectional area of the first purge passage to a pressure behind a throttle valve that is a pressure on a downstream side of the throttle valve of the intake pipe, and to set the drive duty based on the purge classification.

The engine apparatus of the aspect of the present disclosure is configured to determine the purge classification whether the evaporated fuel is the first purge in which the evaporated fuel flows dominantly in a first purge passage or the second purge in which the evaporated fuel flows dominantly in the second purge passage based on a relative ejector pressure that is the pressure of the suction port of the ejector and a value obtained by adding an offset amount based on the cross-sectional area of the second purge passage with respect to of the cross-sectional area of the first purge passage to the pressure behind a throttle valve that is the pressure on a downstream side of the throttle valve of the intake pipe. Since the offset amount based on the cross-sectional area of the second purge passage with respect to of the cross-sectional area of the first purge passage is added to the pressure behind a throttle valve, the purge passage in which the purge flows dominantly can be determined more properly than the pressure not added the offset amount. The "cross-sectional area" is also represented by the pipe diameter.

In such an engine apparatus according to the aspect of the present disclosure, the controller may be configured to estimate the relative ejector pressure based on a pressure difference between a supercharging pressure that is a pressure between the compressor and the throttle valve provided in the intake pipe, and a pressure in front of the compressor that is a pressure on an upstream side of the compressor of the intake pipe, and the drive duty. Thus, the relative ejector pressure can be more properly estimated. As a result, more proper determination can be made that the purge passage through which the purge gas flows dominantly.

Further, in the engine apparatus according to the aspect of the present disclosure, the offset amount may be set that an absolute value of a negative value of the offset amount increases as an absolute value of a negative value of the pressure behind a throttle valve increases. This is based on the fact that the larger absolute value of a negative value of the pressure behind a throttle valve increases, the larger influence of the cross-sectional area of the second purge passage with respect to of the cross-sectional area of the first purge passage is obtained.

In the engine apparatus according to the aspect of the present disclosure, the controller may be configured to set the drive duty by setting the full-open purge rate based on the purge classification. Thus, the drive duty of the purge control valve can be set more properly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to examples.

Figure 1:
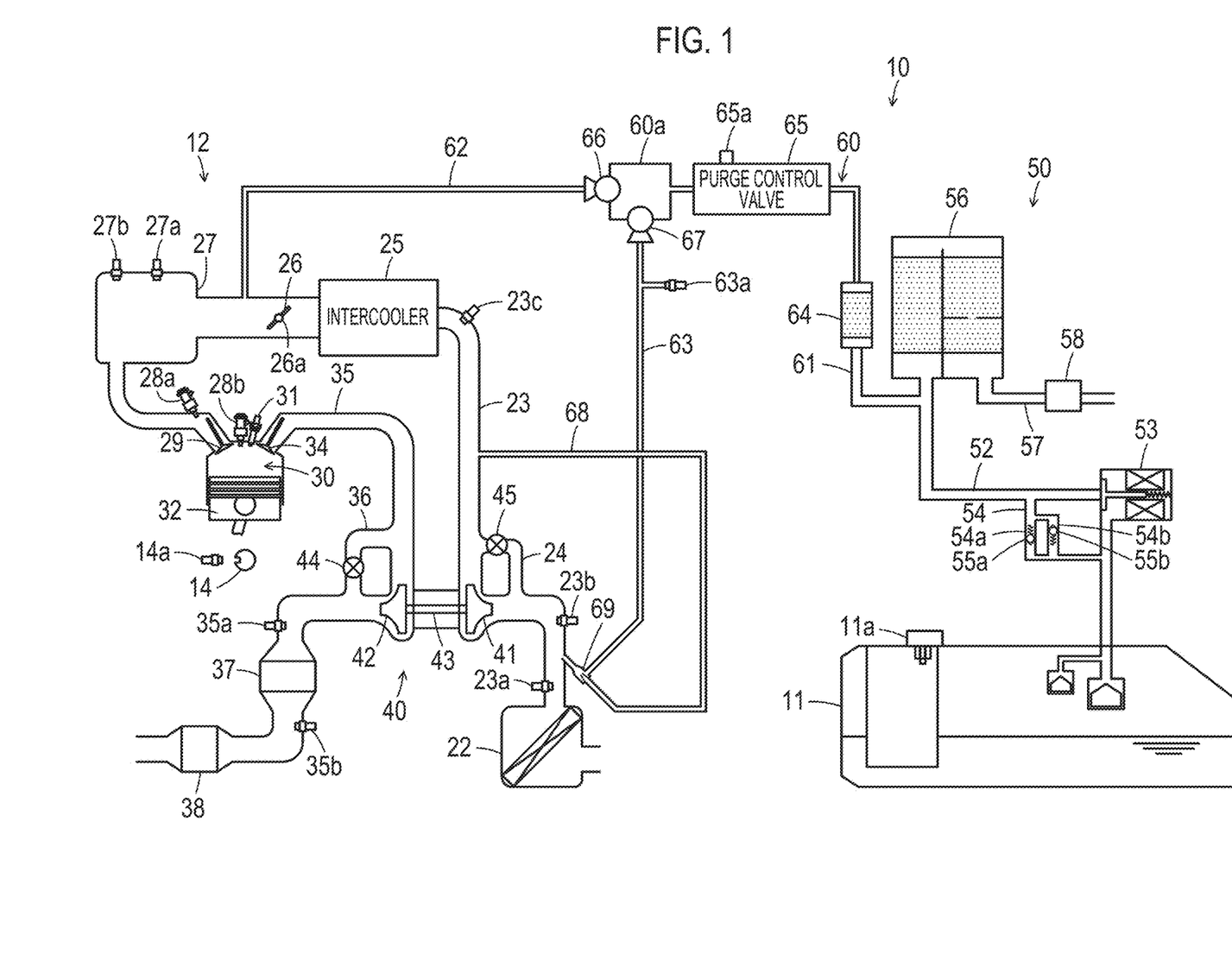
FIG. 1 is a configuration diagram schematically showing a configuration of an engine apparatus 10 as an example of the present disclosure.
Figure 2:
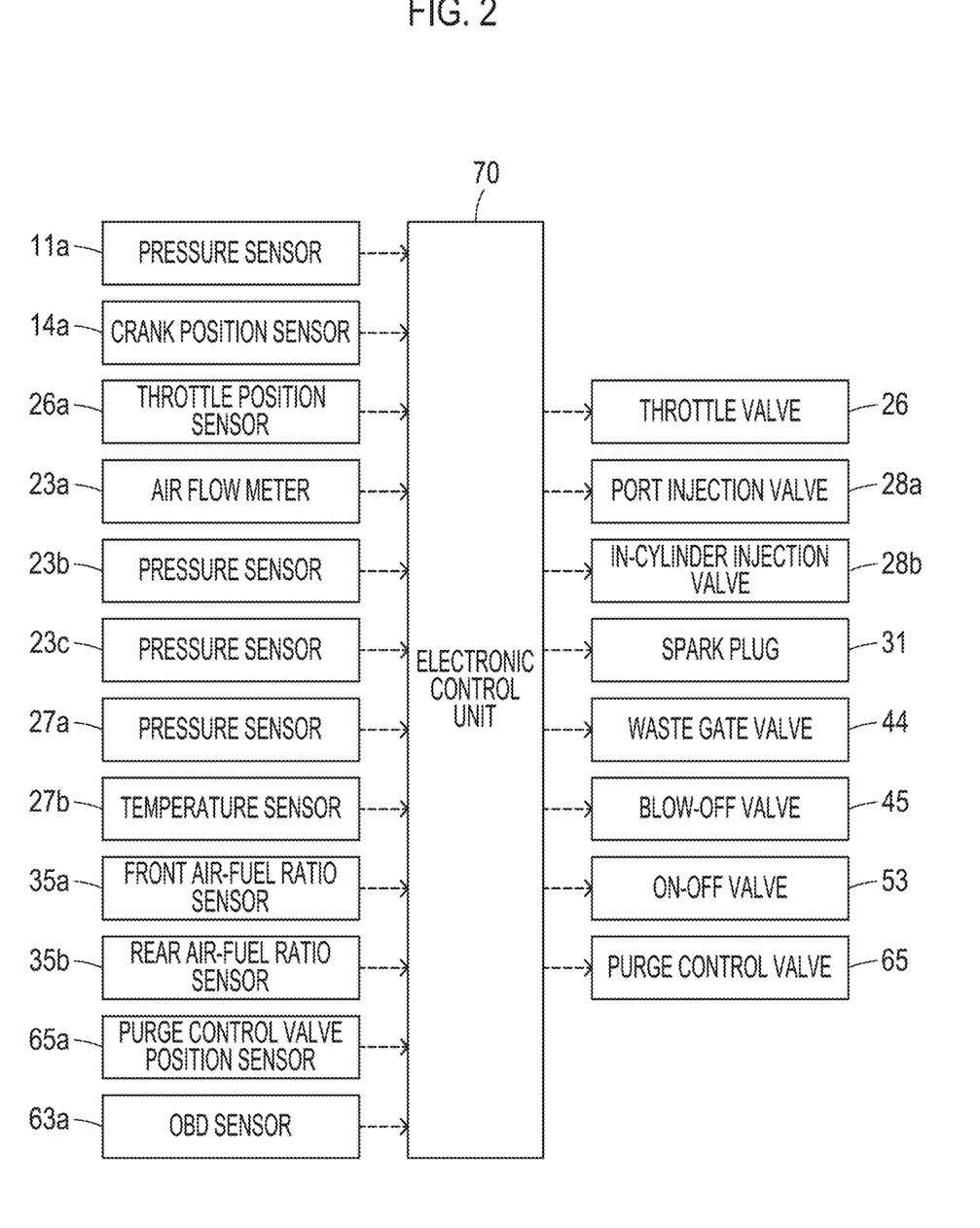
FIG. 2 is an explanatory diagram showing an example of input and output signals of an electronic control unit 70.

FIG. 1 is a configuration diagram showing an outline of the configuration of an engine apparatus 10 as an example of the present disclosure, and FIG. 2 is an explanatory diagram showing an example of an input and output signal of an electronic control unit 70. The engine apparatus 10 of the example is mounted on general automobiles or various hybrid automobiles, and as shown in FIGS. 1 and 2, the engine apparatus includes an engine 12, a supercharger 40, an evaporated fuel treatment device 50, and an electronic control unit 70.

The engine 12 is configured as an internal combustion engine that outputs power using fuel, such as gasoline or light oil supplied from a fuel tank 11 through a feed pump or a fuel passage (not shown). The engine 12 takes the air cleaned by an air cleaner 22 into an intake pipe 23 and passes an intercooler 25, a throttle valve 26, and a surge tank 27 in this order. The engine injects (port injection) fuel from a port injection valve 28a attached to a downstream side of the surge tank 27 of the intake pipe 23, mixes air and fuel and takes into the combustion chamber 30 through the intake valve 29. Further, the engine injects (in-cylinder injection) fuel from the in-cylinder injection valve 28b attached to the combustion chamber 30 to air or air-fuel mixture taken into the combustion chamber 30 through the intake valve 29, and the explosive combustion is caused by an electric spark from a spark plug 31. The engine 12 converts the reciprocating motion of a piston 32 pushed down by the energy generated by such explosive combustion into the rotational motion of a crankshaft 14. The exhaust gas discharged from the combustion chamber 30 through the exhaust valve 34 to the exhaust pipe 35 is discharged to the outside air through the control devices 37, 38 having catalysts (ternary catalyst) for removing harmful components of carbon monoxide (CO), hydrocarbons (HC) and nitrogen oxides (NOx). The engine 12 can be driven solely by port injection, solely by in-cylinder injection, and by both port injection and in-cylinder injection.

The supercharger 40 is configured as a turbocharger and includes a compressor 41, a turbine 42, a rotary shaft 43, a waste gate valve 44, and a blow-off valve 45. The compressor 41 is disposed on an upstream side of the intercooler 25 of the intake pipe 23. The turbine 42 is disposed on an upstream side of the control device 37 of the exhaust pipe 35. The rotary shaft 43 connects the compressor 41 and the turbine 42. The waste gate valve 44 is provided in a bypass pipe 36 that connects an upstream side and a downstream side of the turbine 42 in the exhaust pipe 35, and is controlled by the electronic control unit 70. The blow-off valve 45 is provided in the bypass pipe 24 that connects an upstream side and a downstream side of the compressor 41 in the intake pipe 23, and is controlled by the electronic control unit 70.

In the supercharger 40, by adjusting the opening degree of the waste gate valve 44, the distribution ratio between the exhaust volume flowing through the bypass pipe 36 and the exhaust volume flowing through the turbine 42 is adjusted. Thus, the rotational driving force of the turbine 42 is adjusted, the amount of compressed air by the compressor 41 is adjusted, and the supercharging pressure of the engine 12 (intake pressure) is adjusted. Specifically, the distribution ratio is adjusted such that the smaller the opening degree of the waste gate valve 44 is, the smaller the exhaust volume flowing through the bypass pipe 36 becomes and the exhaust volume flowing through the turbine 42 is adjusted to increase. When the waste gate valve 44 is fully opened, the engine 12 is operable in the same manner as a naturally aspirated engine without the supercharger 40.

Further, in the supercharger 40, when the pressure in the intake pipe 23 on a downstream side of the compressor 41 is higher than the pressure on an upstream side to some content, by opening the blow-off valve 45, the excess pressure on a downstream side of the compressor 41 can be released. In place of the valve controlled by the electronic control unit 70, the blow-off valve 45 may be configured as a check valve that opens when the pressure in the intake pipe 23 on a downstream side of the compressor 41 becomes higher than the pressure on an upstream side of the compressor 41.

The evaporated fuel treatment device 50 includes an introduction passage 52, an on-off valve 53, a bypass passage 54, relief valves 55a, 55b, a canister 56, a purge passage 60, a buffer portion 64, a purge control valve 65, check valves 66, 67, a recirculation passage 68, and an ejector 69.

The introduction passage 52 is connected to the fuel tank 11 and the canister 56. The on-off valve 53 is provided in the introduction passage 52, and is configured as a normally closed type electromagnetic valve. The on-off valve 53 is controlled by the electronic control unit 70.

The bypass passage 54 rather bypasses the fuel tank 11 side and the canister 56 side than the on-off valve 53 of the introduction passage 52 and has branch parts 54a, 54b that are branched into two and merged. The relief valve 55a is provided in the branch part 54a and configured as a check valve. The relief valve 55a opens when the pressure on the fuel tank 11 side becomes to some extent larger than the pressure on the canister 56 side. The relief valve 55b is provided in the branch part 54b and configured as a check valve. The relief valve 55b opens when the pressure on the canister 56 side becomes to some extent larger than the pressure on the fuel tank 11 side.

The canister 56 is connected to the introduction passage 52 and is open to the atmosphere through the atmosphere opening passage 57. The inside of the canister 56 is filled with an adsorbent, such as activated carbon capable of adsorbing the evaporated fuel from the fuel tank 11. An air filter 58 is provided in the atmosphere opening passage 57.

The purge passage 60 is connected to the vicinity of the canister 56 of the introduction passage 52, and branches into the first purge passage 62 and the second purge passage 63 at a branch point 60a in the middle. Hereinafter, the part closer than the branch point 60a of the purge passage 60 to the introduction passage 52 side is referred to as a "common passage 61". The first purge passage 62 is connected between the throttle valve 26 and the surge tank 27 provided intake pipe 23. The second purge passage 63 is connected to the suction port of the ejector 69.

The buffer portion 64 is provided in the common passage 61. The buffer portion 64 is filled with an adsorbent, such as activated carbon capable of adsorbing evaporated fuel from the fuel tank 11 and the canister 56. The purge control valve 65 is provided on the branch point 60a side of the buffer portion 64 of the common passage 61. The purge control valve 65 is configured as a normally closed type electromagnetic valve. The purge control valve 65 is controlled by the electronic control unit 70.

The check valve 66 is provided near the branch point 60a of the first purge passage 62. The check valve 66 allows the evaporated fuel gas (purge gas) containing the evaporated fuel to flow in the direction from the common passage 61 of the purge passage 60 to the first purge passage 62 (intake pipe 23) and prohibits the evaporated fuel gas to flow in the reverse direction. The check valve 67 is provided near the branch point 60a of the second purge passage 63. The check valve 67 allows the evaporated fuel gas to flow in the direction from the common passage 61 of the purge passage 60 to the second purge passage 63 (ejector 69), and prohibits the evaporated fuel gas to flow in the reverse direction.

The recirculation passage 68 is connected between the compressor 41 and the intercooler 25 provided in the intake pipe 23, and is connected to the intake port of the ejector 69. The ejector 69 has an intake port, a suction port, and an exhaust port. The intake port of the ejector 69 is connected to the recirculation passage 68. The suction port is connected to the second purge passage 63. The exhaust port is connected to an upstream side of the compressor 41 of the intake pipe 23. The tip portion of the intake port is tapered.

In this ejector 69, when the supercharger 40 is operated (when the pressure between the compressor 41 and the intercooler 25 provided in the intake pipe 23 becomes a positive pressure), a pressure difference is generated between the intake port and the exhaust port, and the recirculation intake air (intake air recirculated from a downstream side of the compressor 41 of the intake pipe 23 through the recirculation passage 68) flows from the intake port toward the exhaust port. At this time, the recirculation intake air is decompressed at the tip portion of the intake port, and a negative pressure is generated around the tip portion. By the negative pressure thereof, the evaporated fuel gas is sucked from the second purge passage 63 through the suction port. The evaporated fuel gas is supplied to an upstream side of the compressor 41 of the intake pipe 23 through the exhaust port together with the recirculation intake air of the negative pressure.

In the evaporated fuel treatment device 50 thus configured, when the pressure on a downstream side of the throttle valve 26 of the intake pipe 23 (surge pressure Ps described below) is the negative pressure, and the on-off valve 53 and the purge control valve 65 are open state, the check valve 66 becomes open state, and the evaporated fuel gas (purge gas) generated in the fuel tank 11 and the evaporated fuel gas desorbed from the canister 56 are supplied through the introduction passage 52, the common passage 61 and the first purge passage 62 to a downstream side of the throttle valve 26 of the intake pipe 23. Hereinafter, this is referred to as "downstream purge". At this time, when the pressure (supercharging pressure Pc described below) between the compressor 41 and the intercooler 25 provided in the intake pipe 23 is the negative pressure or zero, the ejector 69 is not operated and the check valve 66 is closed state.

Further, when the pressure between the compressor 41 and the intercooler 25 provided in the intake pipe 23 is a positive pressure, and the on-off valve 53 and the purge control valve 65 are in an open state by the operation of the ejector 69, the check valve 67 becomes an open state and the evaporated fuel gas is supplied to an upstream side of the compressor 41 of the intake pipe 23 through the introduction passage 52, the common passage 61, the second purge passage 63 and the ejector 69. Hereinafter, this is referred to as "upstream purge". At this time, when the pressure difference between the pressure on the inside of the common passage 61 and the pressure on a downstream side of the throttle valve 26 of the intake pipe 23 is equal to or more than the valve opening pressure of the check valve 66 (for example, when surge pressure Ps is the negative pressure), the check valve 66 becomes an open state and the downstream purge is performed. That is, both of the downstream purge and the upstream purge are performed (evaporated fuel gas is supplied to both a downstream side of the throttle valve 26 of the intake pipe 23 and an upstream side of the compressor 41 of the intake pipe 23).

The electronic control unit 70 is configured as a microprocessor that centers on a CPU, and includes a ROM that stores the treatment program, a RAM that temporarily stores data, an input and output port, and a communication port in addition to a CPU. Signals from various sensors are input to the electronic control unit 70 through input ports.

The signals input to the electronic control unit 70 include, for example, the pressure Pt from the pressure sensor 11a that detects the pressure in the fuel tank 11, the crank angle θcr from the crank position sensor 14a that detects the rotational position of the crankshaft 14 of the engine 12, the coolant temperature Tw from a coolant temperature sensor (not shown) that detects the coolant temperature of the engine 12, and the throttle opening degree TH from the throttle position sensor 26a that detects the opening degree of the throttle valve 26. Examples of electronic control unit 70 also include a cam position θca from a cam position sensor (not shown) that detects the rotational position of an intake camshaft that opens and closes the intake valve 29 and an exhaust camshaft that opens and closes the exhaust valve 34. Examples of electronic control unit 70 also include the intake air amount Qa from an air flow meter 23a attached to an upstream side of the compressor 41 of the intake pipe 23, intake pressure Pin from a pressure sensor 23b attached to an upstream side of the compressor 41 of the intake pipe 23, and supercharging pressure Pc from a pressure sensor 23c mounted between the compressor 41 of the intake pipe 23 and the intercooler 25. Examples of electronic control unit 70 also include the surge pressure Ps from the pressure sensor 27a attached to the surge tank 27 and the surge temperature Ts from the temperature sensor 27b attached to the surge tank 27. Examples of electronic control unit 70 also include a front air-fuel ratio AF1 from a front air-fuel ratio sensor 35a attached to an upstream side of the control device 37 of the exhaust pipe 35, and a rear air-fuel ratio AF2 from a rear air-fuel ratio sensor 35b attached between the control device 37 and the control device 38 of the exhaust pipe 35. Examples of electronic control unit 70 also include the opening degree Op of the purge control valve 65 from the purge control valve position sensor 65a and the sensor signal Pobd from the OBD sensor (pressure sensor) 63a attached to the second purge passage 63.

Various control signals are output from the electronic control unit 70 through output ports. Examples of signal output from the electronic control unit 70 include a control signal to the throttle valve 26, a control signal to the port injection valve 28a and the in-cylinder injection valve 28b, and a control signal to the spark plug 31. A control signal to the waste gate valve 44, a control signal to the blow-off valve 45, and a control signal to the on-off valve 53 can also be included. A control signal to the purge control valve 65 can also be included.

The electronic control unit 70 calculates a rotational speed Ne of the engine 12 based on the crank angle θcr from the crank position sensor 14a. Further, the electronic control unit 70 calculates the load factor KL (ratio of the volume of air actually taken in one cycle to the stroke volume per cycle of the engine 12) based on the intake air amount Qa from the air flow meter 23a and the rotational speed Ne of the engine 12.

In the engine apparatus 10 of the example thus configured, the electronic control unit 70 is configured to perform, based on the required load factor KL* of the engine 12, an intake air amount control that controls the opening degree of the throttle valve 26, a fuel injection control that controls the amount of fuel injected from the port injection valve 28a and the in-cylinder injection valve 28b, an spark control that controls the spark timing of the spark plug 31, a supercharging control that controls an opening degree of the waste gate valve 44, and a purge control that controls an opening degree of the purge control valve 65.

Figure 3:
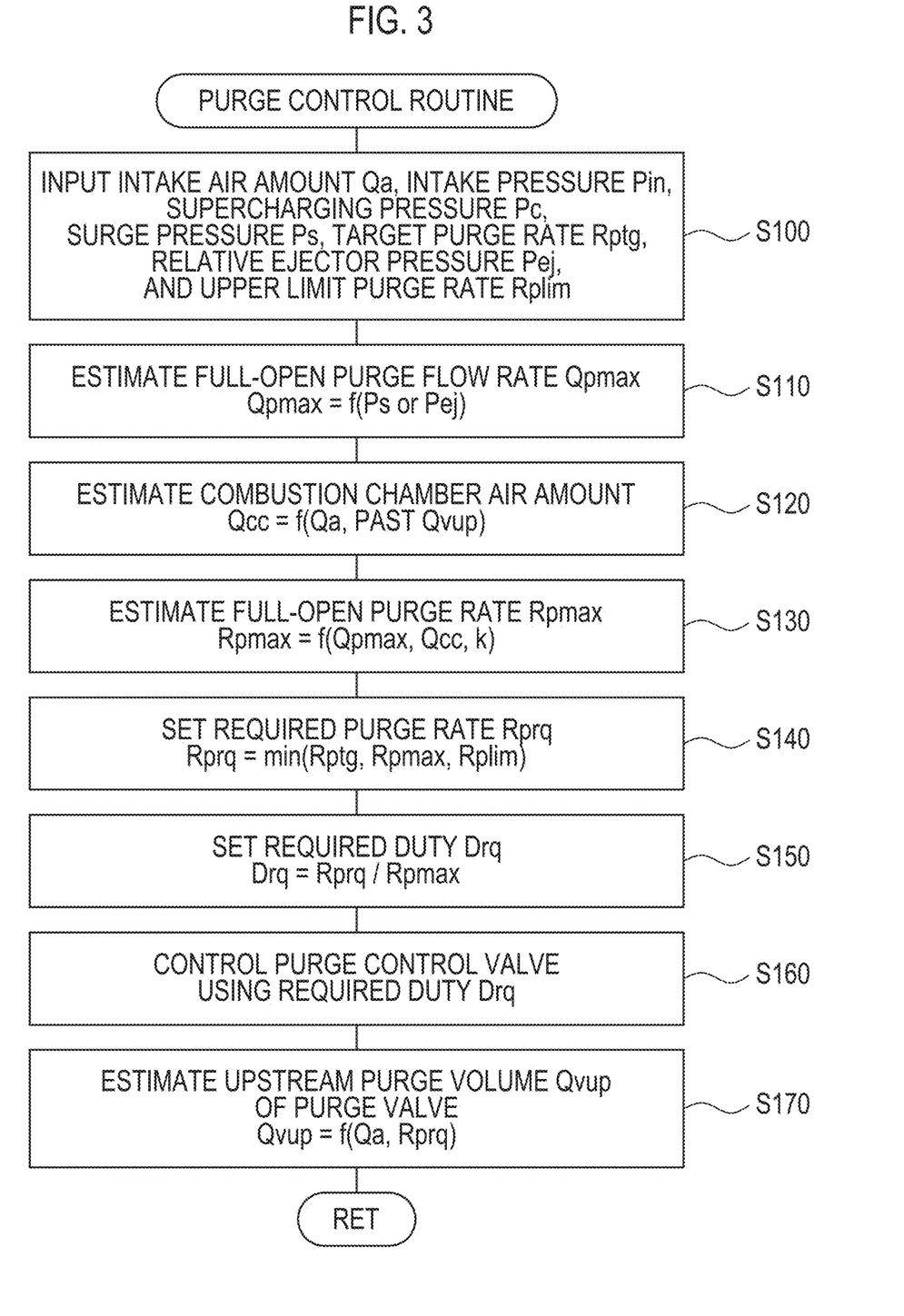
FIG. 3 is a flowchart showing an example of a purge control routine performed by the electronic control unit 70.
Figure 4:
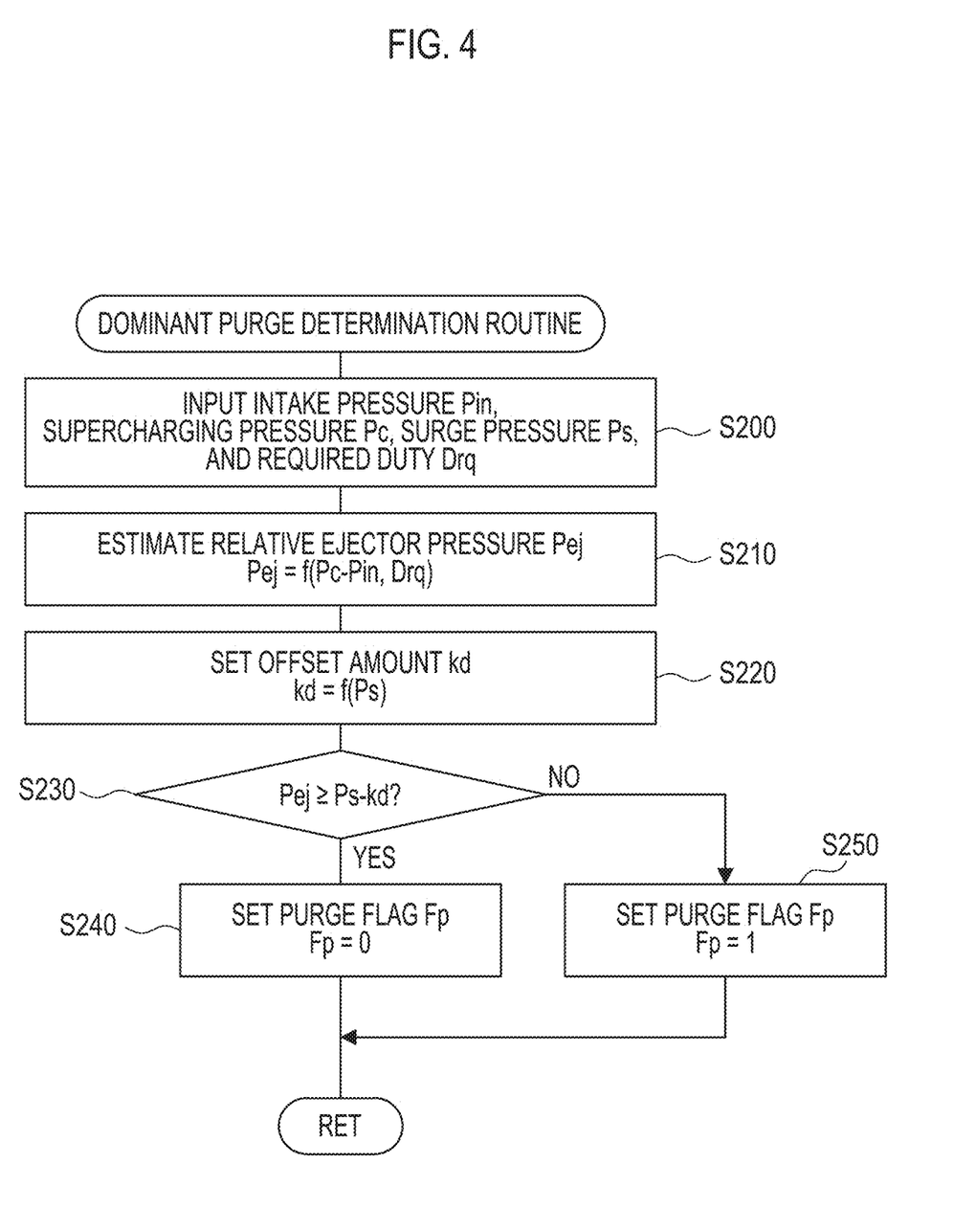
FIG. 4 is a flowchart showing an example of a dominant purge determination routine performed by the electronic control unit 70.

Next, the operation of the engine apparatus 10 of the example, particularly the purge control, will be described. FIG. 3 is a flowchart that shows an example of a purge control routine performed by the electronic control unit 70. FIG. 4 is a flowchart that shows an example of a dominant purge determination routine performed by the electronic control unit 70 to determine whether the dominant purge is the downstream purge or the upstream purge. These routines are repeatedly performed when the purge control is performed. For ease of description, the dominant purge determination will be described using the dominant purge determination routine shown in FIG. 4, and then the purge control based on the determination will be described using the purge control routine shown in FIG. 3.

When the dominant purge determination routine is performed, at first, the electronic control unit 70 is configured to input data, such as an intake pressure Pin, a supercharging pressure Pc, a surge pressure Ps, a required duty Drq (step S200). Here, a value detected by the pressure sensor 23b is input to the intake pressure Pin. A value detected by the pressure sensor 23c is input to the supercharging pressure Pc. A value detected by the pressure sensor 27a is input to the surge pressure Ps. A value set by the purge control routine of FIG. 3 is input to the required duty Drq.

Figure 5:
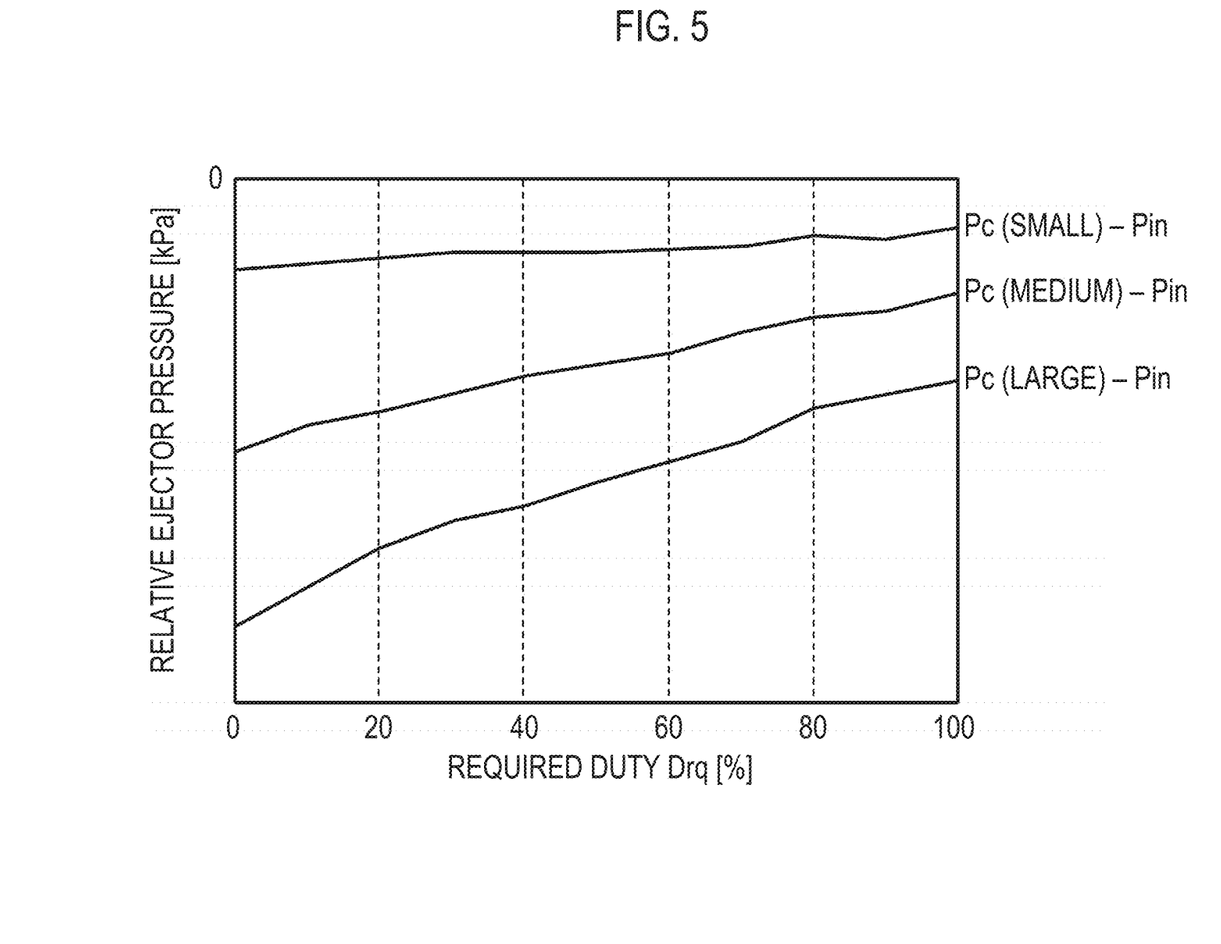
FIG. 5 is an explanatory diagram showing an example of a relative ejector pressure setting map.

When the data is thus input, the relative ejector pressure Pej is estimated based on the value obtained by subtracting the intake pressure Pin from the supercharging pressure Pc (Pc−Pin) and the required duty Drq (Step S210). Here, the relative ejector pressure Pej stores the relationship that is obtained in advance by experiments among the value obtained by subtracting the intake pressure Pin from the supercharging pressure Pc (Pc−Pin), the required duty Drq and the relative ejector pressure Pej as a relative ejector pressure setting map. The relative ejector pressure Pej can be obtained by applying and deriving a value obtained by subtracting the intake pressure Pin from the supercharging pressure Pc (Pc−Pin) and the required duty Drq to the map. An example of a relative ejector pressure setting map is shown in FIG. 5. As shown in the drawing, the relative ejector pressure Pej is estimated to increase as the required duty Drq increases and to increase as the supercharging pressure Pc increases.

Figure 6:
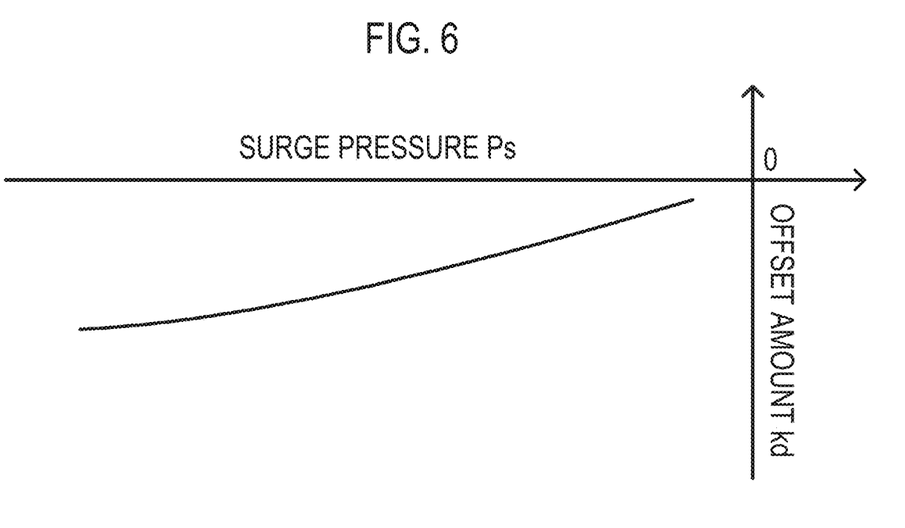
FIG. 6 is an explanatory diagram showing an example of an offset amount setting map.

Next, based on the surge pressure Ps, an offset amount kd for offsetting the surge pressure Ps is set in order to correct the influence based on the cross-sectional area of the second purge passage 63 with respect to of the cross-sectional area of the first purge passage 62 (Step S220). The offset amount kd stores the relationship that is obtained in advance by experiments between the surge pressure Ps and the offset amount kd as an offset amount setting map. The offset amount kd can be obtained by applying and deriving the surge pressure Ps to the map. FIG. 6 shows an example of an offset amount setting map when the cross-sectional area of the second purge passage 63 is smaller than the cross-sectional area of the first purge passage 62. As shown in the drawing, the offset amount kd is set such that the larger absolute value of a negative value of the surge pressure Ps increases, the larger absolute value of a negative value of the offset amount kd increases. This is based on the fact that the larger absolute value of the surge pressure Ps of a negative value increases, the larger influence of the cross-sectional area of the second purge passage 63 with respect to of the cross-sectional area of the first purge passage 62 is obtained. In the case where the first purge passage 62 and the second purge passage 63 are composed of the pipe, since the cross-sectional area is proportional to the square of the pipe diameter, the influence based on the cross-sectional area of the second purge passage 63 with respect to the cross-sectional area of the first purge passage 62 can be rephrased as the influence based on the pipe diameter of the second purge passage with respect to the cross-sectional area of the first purge passage 62.

Subsequently, the determination is made that the relative ejector pressure Pej is whether or not equal to or greater than the value obtained by subtracting the offset amount kd front the surge pressure Ps (Step S230). When the determination is made that the relative ejector pressure Pej is equal to or greater than the value obtained by subtracting the offset amount kd from the surge pressure Ps (equal to or less than the absolute value), the device determines that the purge flows dominantly in the first purge passage 62 (downstream purge is dominant), the value '0' is set to the purge flag Fp (Step S240), and then the routine is terminated. When the determination is made that the relative ejector pressure Pej is smaller than the value obtained by subtracting the offset amount kd from the surge pressure Ps (greater than the absolute value), the device determines that the purge flows dominantly in the second purge passage 63 (upstream purge is dominant), the value '1' is set to the purge flag Fp (Step S240), and then the routine is terminated.

Next, the purge control will be described using the purge control routine shown in FIG. 3. When the purge control routine is performed, first, the electronic control unit 70 input data, such as an intake air amount Qa, an intake pressure Pin, a supercharging pressure Pc, a surge pressure Ps, a target purge rate Rptg, a relative ejector pressure Pej, and upper limit purge rate Rplim (Step S100). Here, a value detected by the air flow meter 23a is input to the intake air amount Qa. A value detected by the pressure sensor 23b is input to the intake pressure Pin. A value detected by the pressure sensor 23c is input to the supercharging pressure Pc. A value detected by the pressure sensor 27a is input to the surge pressure Ps. The target purge rate Rptg is set to gradually increase from the start purge rate Rp 11 when the purge control is performed for the first time at each trip during the downstream purge. The target purge rate Rptg is set to gradually increase from the restart purge rate Rp 12 when the purge control is performed (when the purge control is suspended and restarted) for the second time or thereafter. Further, the target purge rate Rptg is set to gradually increase from the start purge rate Rp 21 that is smaller than the start purge rate Rp 11 for the downstream purge when the purge control is performed for the first time at each trip during the upstream purge. The target purge rate Rptg is set to gradually increase from the restart purge rate Rp 12 that is smaller than the restart purge rate Rp 12 at the time of the downstream purge when the purge control is performed for the second time or thereafter. As the start purge rates Rp11 and Rp21, relatively small values are used in order to suppress the disturbance of the air-fuel ratio in the combustion chamber 30. Examples of when the purge control is suspended, the accelerator is turned off while the vehicle on which the engine apparatus 10 is mounted is traveling and the fuel for the engine 12 is cut off. As the restart purge rates Rp12 and Rp22, values equal to or less than the required purge rate Rprq immediately before suspension (refer to Step S140 described below) are used. The value estimated by Step S210 of the dominant purge determination routine of FIG. 4 is input to the relative ejector pressure Pej. The upper limit purge rate Rplim is input since the upper limit purge rate Rp1 is set when the downstream purge is dominant and the upper limit purge rate Rp2 smaller than the upper limit purge rate Rp1 of the downstream purge is set when the upstream purge is dominant.

Figure 7:
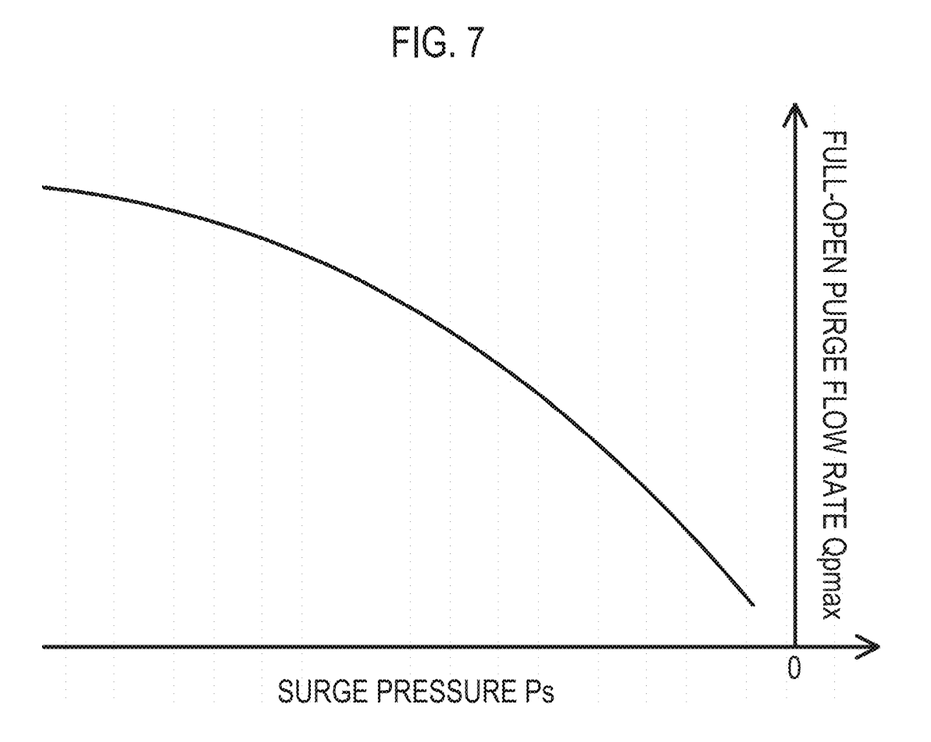
FIG. 7 is an explanatory diagram showing an example of a full-open purge flow rate estimation map using surge pressure Ps.
Figure 8:
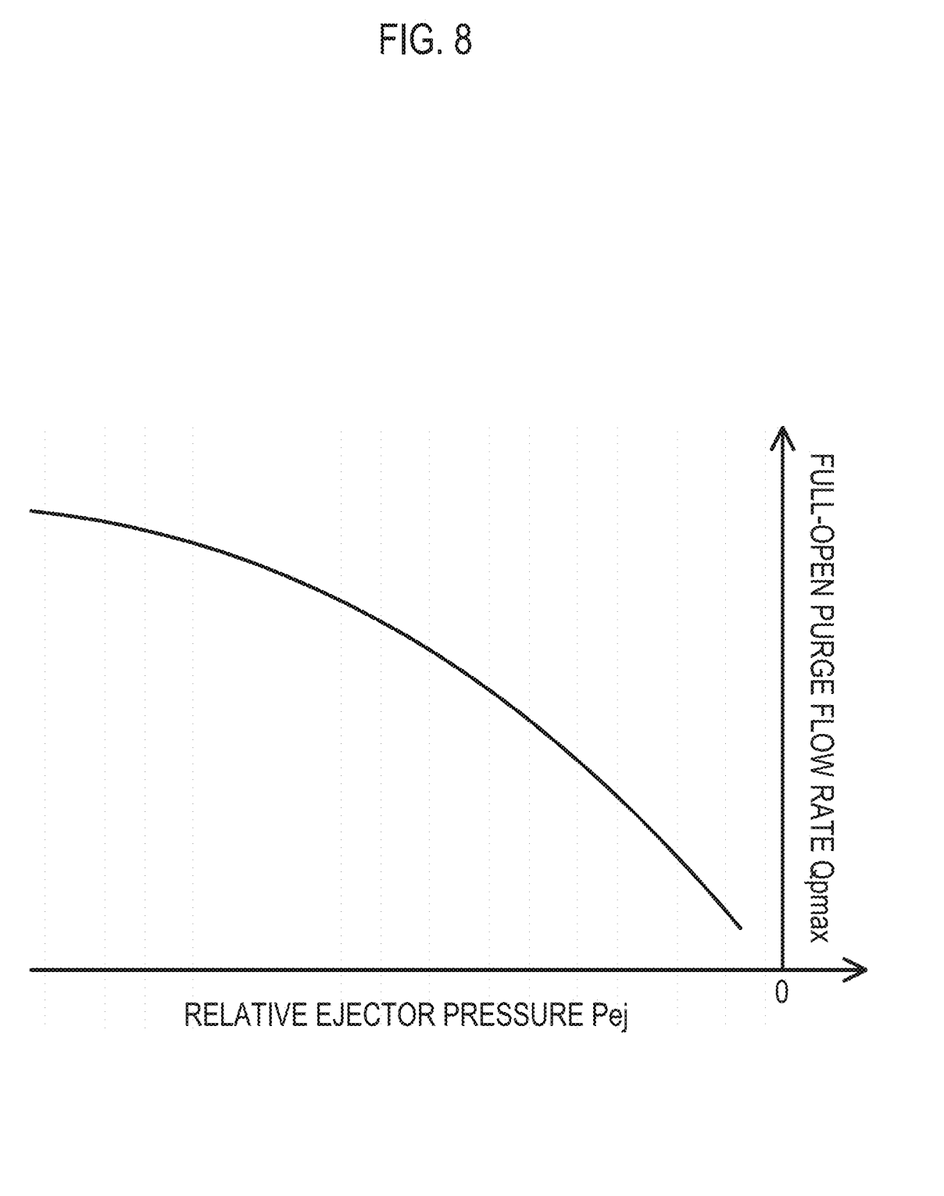
FIG. 8 is an explanatory diagram showing an example of a full-open purge flow rate estimation map using a relative ejector pressure Pej.

When the data is thus input, the full-open purge flow rate Qpmax is estimated based on the surge pressure Ps or the relative ejector pressure Pej (Step S110). Here, the full-open purge flow rate Qpmax is the purge flow rate (volume flow rate of the evaporated fuel gas supplied to the intake pipe 23) when the drive duty of the purge control valve 65 is 100%. When the purge flag Fp is '0' (downstream purge is dominant), the full-open purge flow rate Qpmax stores the relationship is obtained in advance by experiments, between the surge pressure Ps and the full-open purge flow rate Qpmax as a full-open purge flow rate setting map. The full-open purge flow rate Qpmax can be obtained by applying and deriving the surge pressure Ps to the map. An example of a full-open purge flow rate estimation map using the surge pressure Ps is shown in FIG. 7. As shown in the drawing, the full-open purge flow rate Qpmax is estimated as a value that increases when the absolute value of the surge pressure Ps as a negative value increases. On the other hand, when the purge flag Fp is '1' (upstream purge is dominant), the full-open purge flow rate Qpmax stores the relationship obtained in advance by experiments between the relative ejector pressure Pej and the full-open purge flow rate Qpmax as a full-open purge flow rate setting map. The full-open purge flow rate Qpmax can be obtained by applying and deriving the relative ejector pressure Pej to the map. An example of a full-open purge flow rate estimation map using the relative ejector pressure Pej is shown in FIG. 8. As shown in the drawing, the full-open purge flow rate Qpmax is estimated as a value that increases when the absolute value of the relative ejector pressure Pej as a negative value increases.

Subsequently, the combustion chamber air amount Qcc that is an amount of air in the combustion chamber 30 is estimated based on the intake air amount Qa, and the upstream purge volume (past Qvup) estimated in the processing of Step S170 described below when the routine was performed in the past (Step S120). Here, the upstream purge volume Qvup is the flow rate of the evaporated fuel gas on the introduction passage 52 side with respect to the purge control valve 65. The combustion chamber air amount Qcc can be obtained, for example, by applying the intake air amount Qa and the past upstream purge volume (past Qvup) to the relationship between the intake air amount Qa and the past upstream purge volume (Qvup in the past) and the combustion chamber air amount Qcc. As the past upstream purge volume (past Qvup), using the past upstream purge volume Qvup solely a long time ago as the rotational speed Ne of the engine 12 is smaller is desirable, but for the simplicity, the upstream purge volume Qvup before a certain period of time may be used.

When the full-open purge flow rate Qpmax and the combustion chamber air amount Qcc are thus obtained, the full-open purge rate Rpmax is estimated based on these values (Step S130). The full-open purge rate Rpmax can be calculated by dividing the full-open purge flow rate Qpmax by the combustion chamber air amount Qcc.

Next, the target purge rate Rptg is limited by the full-open purge rate Rpmax and the upper limit purge rate Eplim (upper limit guard), and the required purge rate Rprq is set (step S140). That is, the required purge rate Rprq is set the smallest value among the target purge rate Rptg, the full-open purge rate Rpmax, and the upper limit purge rate Eplim. Then, the required duty Drq of the purge control valve 65 is set by dividing the required purge rate Rprq by the full-open purge rate Rpmax (Step S150), and the purge control valve 65 is controlled using the set the required duty Drq (Step S160). After that, the upstream purge volume Qvup is estimated based on the intake air amount Qa and the required purge rate Rprq (step S170), and this routine is terminated. For example, the upstream purge volume Qvup stores the relationship that is obtained in advance by experiments between the intake air amount Qa, the required purge rate Rprq, and the upstream purge volume Qvup as an upstream purge amount setting map. The upstream purge volume Qvup can be estimated by applying and deriving the intake air amount Qa and the required purge rate Rprq to the map.

In this way, although parameters used for purge control, such as target purge rate Rptg, upper limit purge rate Rplim, and full-open purge rate Rpmax are different depending on whether the downstream purge is dominant or the upstream purge is dominant, the required duty Drq of the purge control valve 65 can be set more properly by determining whether the downstream purge is dominant or the upstream purge is dominant.

In the engine apparatus of the example described above, the relative ejector pressure Pej is estimated based on a value obtained by subtracting the intake pressure Pin from the supercharging pressure Pc (Pc–Pin) and the required duty Drq, and the offset amount kd for correcting the influence based on the cross-sectional area of the second purge passage with respect to of the cross-sectional area of the first purge passage 62 is set based on the surge pressure Ps. Then, by determining whether or not the relative ejector pressure Pej is equal to or greater than the value obtained by subtracting the offset amount kd from the surge pressure Ps, whether the downstream purge is dominant or the upstream purge is dominant is determined. Therefore, whether the downstream purge is dominant or the upstream purge is dominant can be determined more properly as compared with the determination that does not consider the influence based on the cross-sectional area of the second purge passage with respect to the cross-sectional area of the first purge passage 62. As a result, the required duty Drq of the purge control valve 65 can be set more properly, and the purge control can be performed more properly.

In the engine apparatus 10 of the example, the target purge rate Rptg, the upper limit purge rate Rplim, and the full-open purge rate Rpmax are set to be different depending on whether the downstream purge is dominant or the upstream purge is dominant. However, depending on whether the downstream purge is dominant or the upstream purge is dominant, solely some among the target purge rate Rptg, the upper limit purge rate Rplim, and the full-open purge rate Rpmax may set to be different. In addition to the target purge rate Rptg, the upper limit purge rate Rplim, and the full-open purge rate Rpmax, other parameters used for purge control may set to be different. Solely parameter among the parameters used for purge control that is different from the target purge rate Rptg, the upper limit purge rate Rplim, and the full-open purge rate Rpmax may set to be different.

In the engine apparatus 10 of the example, the offset amount kd is set based on the surge pressure Ps, and whether the downstream purge is dominant or the upstream purge is dominant is determined based on the relative ejector pressure Pej and the value obtained by subtracting the offset amount kd from the surge pressure Ps. However, whether the downstream purge is dominant or the upstream purge is dominant is determined based on the relative ejector pressure Pej and the value obtained by subtracting the offset amount kd irrelevant of the surge pressure Ps from the surge pressure Ps. Even in this case, although the precision is inferior to that of the example, whether the downstream purge is dominant or the upstream purge is dominant can be determined more properly as compared with the determination that does not consider the influence based on the cross-sectional area of the second purge passage with respect to the cross-sectional area of the first purge passage 62.

In the engine apparatus 10 of the example and the modified example, in the evaporated fuel treatment device 50, the purge passage 60 is connected to the vicinity of the canister 56 of the introduction passage 52. However, the purge passage 60 may be connected to the canister 56.

In the engine apparatus 10 of the example, the supercharger 40 is configured as a turbocharger in which a compressor 41 disposed in the intake pipe 23 and a turbine 42 disposed in the exhaust pipe 35 is connected through a rotary shaft 43. However, alternatively, the compressor driven by the engine 12 or the motor may be configured as a supercharger dispose in the intake pipe 23.

In the example, the design of the engine apparatus 10 mounted on a general automobile or various hybrid automobiles is used. However, the engine apparatus may use the design of the engine apparatus mounted on a vehicle other than an automobile or mounted on a non-moving facility, such as a construction facility.

The correspondence between the main elements of the examples and the main elements of the disclosure described in the column of means for solving the problem will be described. In the example, the engine 12 corresponds to the "engine", the supercharger 40 corresponds to the "supercharger", the evaporated fuel treatment device 50 corresponds to the "evaporated fuel treatment device", and the electronic control unit 70 corresponds to the "controller".

Regarding the correspondence between the main elements of the examples and the main elements of the disclosure described in the column of means for solving the problem, since the examples are examples for specifically describing the mode for carrying out the disclosure described in the column of means for solving the problem, the disclosure described in the column of means for solving the problem does not limit the elements. That is, the interpretation of the disclosure described in the column of means for solving the problem should be performed based on the description in the column, and the example is solely a specific example of the disclosure described in the column of means for solving the problem.

Hereinabove, the example of the disclosure has been described by using the example. However, the aspect of the disclosure is not limited to the example and may be implemented in various forms of course without departing from the scope of the disclosure.

The present disclosure is applicable to, for example, manufacturing industries of engine apparatus.

What is claimed is:

1. An engine apparatus comprising:
an engine that receives fuel from a fuel tank and has a throttle valve disposed in an intake pipe;
a supercharger that has a compressor disposed on an upstream side of the throttle valve of the intake pipe;
an evaporated fuel treatment device that has:
a supply passage for supplying evaporated fuel gas containing evaporated fuel generated in the fuel tank to the intake pipe, and
a purge control valve provided in the supply passage; and
a controller configured to, in a case where the evaporated fuel gas is supplied to the intake pipe, set a drive duty of the purge control valve based on a full-open purge rate when the drive duty is 100% and a required purge rate and control the purge control valve, wherein:
the supply passage branches into a first purge passage and a second purge passage at the intake pipe side from the purge control valve;

the first purge passage is connected to a downstream side of the throttle valve of the intake pipe;

the evaporated fuel treatment device further has an ejector that has:

an intake port connected between the compressor and the throttle valve provided in the intake pipe through a recirculation passage, an exhaust port connected to an upstream side of the compressor of the intake pipe, and a suction port connected to the second purge passage; and the controller is configured to:

determine a purge classification whether the evaporated fuel is a first purge in which the evaporated fuel flows dominantly in the first purge passage or a second purge in which the evaporated fuel flows dominantly in the second purge passage based on a comparison between (i) a relative ejector pressure that is a pressure of the suction port of the ejector and (ii) a value obtained by subtracting an offset amount based on a cross-sectional area of the second purge passage with respect to a cross-sectional area of the first purge passage from a pressure behind the throttle valve that is a pressure on the downstream side of the throttle valve of the intake pipe, and set the drive duty based on the purge classification.

2. The engine apparatus according to claim 1, wherein the controller is configured to estimate the relative ejector pressure based on a pressure difference between (a) a supercharging pressure that is a pressure between the compressor and the throttle valve provided in the intake pipe, and (b) a pressure in front of the compressor that is a pressure on the upstream side of the compressor of the intake pipe, and the drive duty.

3. The engine apparatus according to claim 1, wherein the offset amount is set so that an absolute value of a negative value of the offset amount increases as an absolute value of a negative value of the pressure behind the throttle valve increases.

4. The engine apparatus according to claim 1, wherein the controller is configured to set the drive duty by setting the full-open purge rate based on the purge classification.

* * * * *